United States Patent
Tallberg

(10) Patent No.: US 9,661,861 B1
(45) Date of Patent: May 30, 2017

(54) APPARATUS AND METHOD FOR INFLATING A CASING ENCLOSING A SAUSAGE STICK

(71) Applicant: ViskoTeepak Belgium NV, Lommel (BE)

(72) Inventor: Roland Tallberg, Hango (FI)

(73) Assignee: VISKOTEEPAK BELGIUM NV, Lommel (BE)

( * ) Notice: Subject to any disclaimer, the term of this patent is extended or adjusted under 35 U.S.C. 154(b) by 0 days.

(21) Appl. No.: 15/274,489

(22) Filed: Sep. 23, 2016

(30) Foreign Application Priority Data

Jan. 5, 2016 (FI) .................................. 20165002

(51) Int. Cl.
*A22C 11/00* (2006.01)
*A22C 13/02* (2006.01)

(52) U.S. Cl.
CPC ............ *A22C 13/02* (2013.01); *A22C 11/008* (2013.01); *A22C 13/023* (2013.01); *A22C 2013/021* (2013.01)

(58) Field of Classification Search
CPC ....... A22C 11/00; A22C 11/001; A22C 13/00; A22C 13/003
USPC ........... 452/21–26, 30–32, 35–37, 46–48, 51
See application file for complete search history.

(56) References Cited

U.S. PATENT DOCUMENTS

| 2,424,346 | A | | 7/1947 | Wilcoxon |
| 2,434,316 | A | | 1/1948 | Golden et al. |
| 2,725,591 | A | | 12/1955 | Cline et al. |
| 2,757,409 | A | | 8/1956 | Parkes et al. |
| 2,757,410 | A | | 8/1956 | Cline |
| 3,594,856 | A | * | 7/1971 | Michl ................ A22C 13/0013 137/624.17 |
| 3,988,804 | A | * | 11/1976 | Regner .................. A22C 13/02 138/118.1 |

(Continued)

FOREIGN PATENT DOCUMENTS

| EP | 2266408 A1 | 12/2010 |
| EP | 2796048 A1 | 10/2014 |
| EP | 2 923 579 A1 | 9/2015 |

OTHER PUBLICATIONS

Communication of Acceptance under Section 29a of Patents Decree issued by the Finnish Patent and Registration Office in relation to Finnish Application No. 20165002 dated Jul. 15, 2016 (2 pages).

(Continued)

*Primary Examiner* — Richard Price, Jr.
(74) *Attorney, Agent, or Firm* — Robert P. Michal, Esq.; Carter, DeLuca, Farrell & Schmidt, LLP

(57) ABSTRACT

An apparatus and method for inflating a casing enclosing a sausage stick is disclosed, wherein the apparatus includes a holder configured to receive the sausage stick enclosed in the casing and move together with the sausage stick thereby received from an inflation starting position to an inflation end position, and an inflating needle configured to penetrate the casing of the sausage stick received by the holder and to follow the holder immoveably relative to the holder moving together with the sausage stick from the inflation starting position to the inflation end position to inflate the casing between the inflation starting position and the inflation end position.

17 Claims, 6 Drawing Sheets

(56) References Cited

U.S. PATENT DOCUMENTS

| | | | | |
|---|---|---|---|---|
| 4,153,975 | A | * | 5/1979 | Ziolko .................. A22C 13/02 |
| | | | | 452/32 |
| 4,370,780 | A | * | 2/1983 | Kollross ................ A22C 13/02 |
| | | | | 452/25 |
| 4,682,387 | A | | 7/1987 | Leining |
| 6,080,055 | A | | 6/2000 | Leining et al. |
| 6,354,931 | B1 | | 3/2002 | Klyce |
| 6,468,143 | B1 | | 10/2002 | White et al. |
| 7,377,842 | B2 | * | 5/2008 | Painter ................. A22C 11/003 |
| | | | | 452/50 |
| 2005/0100644 | A1 | | 5/2005 | Painter et al. |

OTHER PUBLICATIONS

Office Action issued by the Finnish Patent and Registration Office in relation to Finnish Application No. 20165002 dated Mar. 15, 2016 (5 pages).

Search Report issued by the Finnish Patent and Registration Office in relation to Finnish Application No. 20165002 dated Mar. 15, 2016 (2 pages).

Extended European Search Report issued by the European Patent Office in relation to European Patent Application No. 16203732.9-1655 dated Mar. 20, 2017 (8 pages).

* cited by examiner

APPARATUS AND METHOD FOR INFLATING A CASING ENCLOSING A SAUSAGE STICK

CROSS-REFERENCE TO RELATED APPLICATIONS

This Application claims priority to Finnish Application No. 20165002, filed Jan. 5, 2016 the entire disclosure of which is incorporated herein by reference.

FIELD OF THE INVENTION

The invention relates to an apparatus and method for inflating a casing enclosing a sausage stick.

BACKGROUND

Sausages are usually formed by stuffing sausage emulsion into a casing. The sausages stuffed in the casings may then be closed and further processed e.g. by cooking, drying and/or fermenting. When the sausage is formed, the casing may be removed. Manual removal of the casings from sausage sticks tends to be time-consuming and labour intensive, and therefore there remains a need for faster, more efficient and more reliable means for releasing and removing the casings from sausage sticks.

SUMMARY

This Summary is provided to introduce a selection of concepts in a simplified form that are further described below in the Detailed Description. This Summary is not intended to identify key features or essential features of the claimed subject-matter, nor is it intended to be used to limit the scope of the claimed subject-matter.

An apparatus for inflating a casing enclosing a sausage stick is disclosed. The apparatus comprises a holder configured to receive the sausage stick enclosed in the casing and move together with the sausage stick thereby received from an inflation starting position to an inflation end position. The apparatus further comprises an inflating needle configured to penetrate the casing of the sausage stick received by the holder and to follow the holder immoveably relative to the holder moving together with the sausage stick from the inflation starting position to the inflation end position to inflate the casing between the inflation starting position and the inflation end position.

A method for inflating a casing enclosing a sausage stick is disclosed. The method comprises providing the sausage stick enclosed in the casing; penetrating the casing with an inflating needle; and moving the sausage stick enclosed in the casing from an inflation starting position to an inflation end position; wherein the inflating needle follows the sausage stick immoveably relative to the sausage stick moving from the inflation starting position to the inflation end position, the inflating needle thereby inflating the penetrated casing between the inflation starting position and the inflation end position.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION

Figure 1:
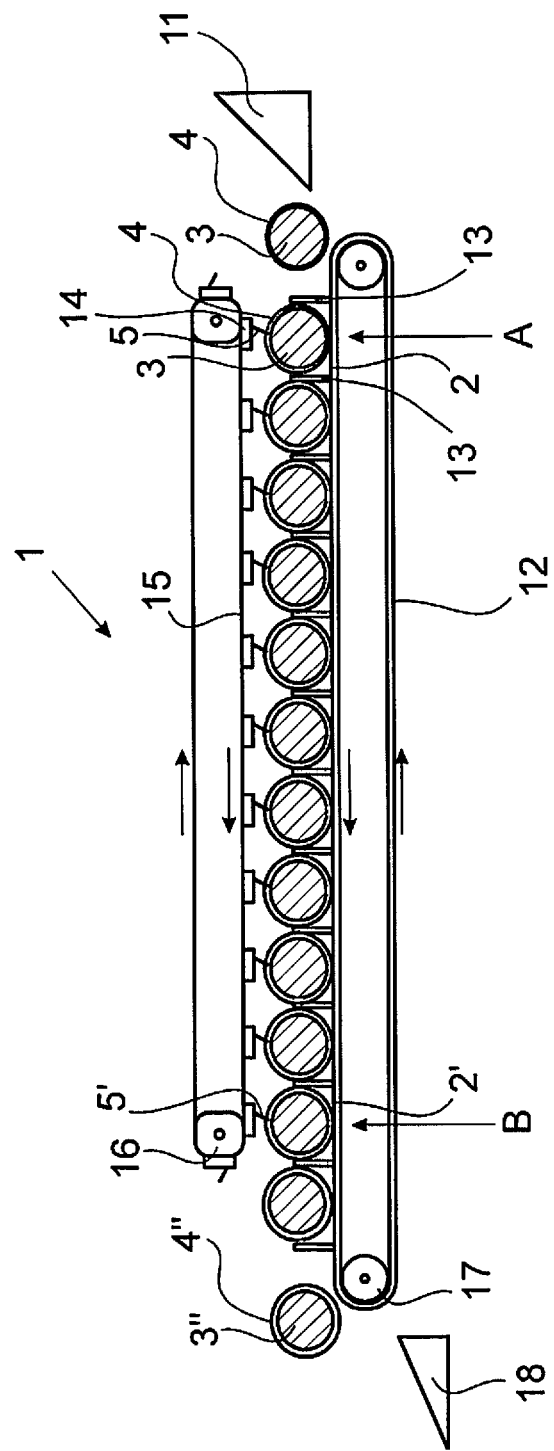
FIG. 1 shows an embodiment of the apparatus for inflating a casing enclosing a sausage stick.

The detailed description provided below in connection with the appended drawings is intended as a description of the present examples and is not intended to represent the only forms in which the present example may be constructed or utilized. However, the same or equivalent functions and sequences may be accomplished by different examples.

An apparatus for inflating a casing enclosing a sausage stick is disclosed, the apparatus comprising a holder configured to receive the sausage stick enclosed in the casing and move together with the sausage stick thereby received from an inflation starting position to an inflation end position; and an inflating needle configured to penetrate the casing of the sausage stick received by the holder and follow the holder immoveably relative to the holder moving together with the sausage stick from the inflation starting position to the inflation end position to inflate the casing between the inflation starting position and the inflation end position.

Thus, when the apparatus is in use, the holder may receive the sausage stick enclosed in the casing, whereby both the holder and the sausage stick received by the holder move at least from the inflation starting position to the inflation end position. The inflating needle, when in use, also moves, but moves in such a manner that it moves simultaneously with the holder, so that the inflating needle follows the holder and while moving, i.e. following the holder, remains immoveable relative to the holder.

The holder may be configured to receive the sausage stick enclosed in the casing at a receiving position and discharge the sausage stick at a discharging position. The holder may thus be configured to move from the receiving position to the discharging position. The receiving position may be the same or different from the inflation starting position, and the discharging position may be the same or different from the inflation end position. When the apparatus is in use, the sausage stick enclosed in the casing may be received when the holder is in the receiving position, the casing may be inflated when the holder is moving between the inflation starting position and the inflation end position, and the sausage stick enclosed in the inflated casing may be discharged at the discharging position of the holder. The holder may thus be configured to move e.g. from the receiving position to the inflation starting position, from the inflation starting position to the inflation end position, and from the inflation end position to the discharging position. As the holder may be configured to move along a path from the receiving position and the discharging position, the path along which the holder is configured to move between the inflating start position and the inflating end position may be a part of the path between the receiving position and the discharging position.

The sausage stick may be received by the holder in the receiving position simply so that it is pushed or falls into the holder. Other means for positioning the sausage stick into the holder are also disclosed later in this specification.

The sausage stick, once the casing is inflated, may be discharged from the holder in the discharge position in various ways. It may simply fall or roll off or away from the holder when the holder is in a suitable position. The apparatus may also comprise means for discharging the sausage stick, for instance a rod or other member configured to push the sausage stick away from the holder.

In the context of this specification, the term "inflating" or "inflation" may refer to blowing gas in the casing enclosing the sausage stick using the inflating needle, whereby the casing expands radially away from the sausage stick. The casing may thereby be released from the surface of the sausage stick fully or in part. The gas may be pressurized so that when being blown in the casing, it exerts a pressure higher than ambient pressure within the casing. The pressure may be adjusted depending e.g. on the extent of adherence of the casing to the surface of the sausage stick (i.e. the surface of the sausage emulsion of which the sausage stick is formed), the capability of the casing to withstand pressure without being ruptured, and on other considerations. Casings may have a predetermined recommended maximum stuffing diameter, i.e. a recommended maximum diameter it can reach upon being radially expanded (e.g. during stuffing or inflating) without an increased risk of being ruptured. Manufacturers of casings typically indicate such a recommended maximum stuffing diameter for a casing. The recommended maximum stuffing diameter for a casing of a particular trade size or caliber may be predetermined based on casing characteristics and experimental tests. Overinflating a casing, e.g. to a diameter larger than the recommended maximum stuffing diameter, may entail an increased risk of the casing rupturing or bursting upon inflating. If a casing ruptures or bursts upon inflating, it may hamper subsequent operations, such as cutting and/or stripping the casing off the sausage stick, and the release of the casing from the surface of the sausage stick may be poor or incomplete.

In the context of this specification, the term "inflation starting position" may be understood as referring to a position in which the holder, together with the sausage stick received therein, may be configured to be when the inflating needle is configured to start inflating the casing. The inflation starting position may be the same or different from the receiving position.

In the context of this specification, the term "inflation end position" may be understood as referring to a position in which the holder, together with the sausage stick received therein, may be configured to be when the inflating needle is configured to stop inflating the casing. The inflation end position may be the same or different from the discharging position.

The inflating needle may thus also be configured to move simultaneously as the holder moves, as opposed to being stationary, provided it is configured to move immoveably in relation to the holder moving together with the sausage stick. This allows for the inflating needle to penetrate and inflate the casing while the holder together with the sausage stick moves. As the inflating needle may be configured to move and follow the holder, as opposed to being stationary, there is no need to stop the holder for the inflating needle to inflate the casing; instead, the holder and the sausage stick may move while the casing is being inflated, and may even move more or less continuously. This may be particularly beneficial for an apparatus or a process line intended for high throughput, as delays resulting from discontinuing the movement of the sausage sticks in such an apparatus or process line for the purpose of inflating the casings may be shortened or even completely avoided. Furthermore, it may be possible to inflate a casing longer without jeopardizing the output of the apparatus. Large sausage sticks, in particularly dry sausages, may require a longer inflating time to be released completely. Thereby the release of the casing from the surface of the sausage stick may be improved.

The inflating needle configured to penetrate the casing of the sausage stick received by the holder may in principle be any sharp object capable of penetrating a casing enclosing a sausage stick and having a conduit suitable for conveying or configured to convey pressurized gas into the penetrated casing and thereby inflate the casing. The inflating needle may be, for instance, a hollow needle, a syringe, a pin or a nozzle. Various examples of such an inflating needle are described later in this specification. The inflating needle may be in fluid connection to a source of gas, such as pressurized air. The apparatus may thus comprise one or more gas channels or ducts configured to convey gas to the inflating needle (or to a plurality of inflating needles).

The inflating needle may have one or more output orifices configured to convey the pressurized gas into the penetrated casing.

In order to be configured to follow the holder immoveably relative to the holder moving together with the sausage stick from the inflation starting position to the inflation end position to inflate the casing between the inflation starting position and the inflation end position, the inflating needle may be operatively connected with or to means for moving the inflating needle, such as a motor, a conveyor, a bar for movement in the direction of movement of the holder, or another apparatus suitable for or configured to move the inflating needle.

The dimensions of the inflating needle may be such that it is configured to penetrate the casing (but not necessarily the sausage stick, so as not to damage the sausage stick) and to inflate the casing.

In an embodiment, the inflating needle is configured to penetrate the casing but not the sausage stick to inflate the casing. In such an embodiment, the inflating needle may blow gas into the space between the casing and the sausage stick only. Such an embodiment may be beneficial in particular in cases in which the sausage stick has a relatively hard or solid consistency. In another embodiment, the inflating needle is configured to penetrate the casing and an end portion of the sausage stick to inflate the casing. The end portion may be intended to be cut off after inflating. In such an embodiment, the inflating needle may blow gas into the space between the casing and the sausage stick and into the end portion of the sausage stick. Such an embodiment may be beneficial in particular in cases in which the sausage stick has a softer consistency. In an embodiment, the inflating needle is configured to penetrate the casing and the end portion of the sausage stick at a distance from the edge of the end portion, the distance being equal to or greater than the thickness of the needle or equal to or greater than two times the thickness of the needle.

The gas for inflating the casing may, in principle, be any gas, for instance any inert gas. Air may be commonly used, but other gases such as nitrogen or argon or any mixtures of such gases may as well be used.

The apparatus may be particularly suitable for inflating a casing enclosing a dry sausage. The casings of dry sausages may, due to their manufacturing process, have the tendency to adhere relatively strongly to the surface of the dry sausages enclosed therein. Further, due to the size of dry sausages, the inner surface area of the casing facing the surface of the dry sausage tends to be relatively large.

The casing may be a tubular artificial food casing, for instance a tubular artificial food casing comprising or formed of regenerated cellulose, plastic and/or textile. The casing may also be suitable for dry sausages. Casings comprising regenerated cellulose, also commonly referred to as cellulose-based food casings, may comprise at least one layer of regenerated cellulose. Such a casing may also comprise a fibrous reinforcement. The fibrous reinforcement may be tubular. A fibrous reinforcement may be provided e.g. by shaping a fiber paper to form a tube. The fibrous reinforcement may then be impregnated or coated with viscose, which forms a layer of regenerated cellulose when coagulated.

The tubular artificial food casing may comprise a fibrous reinforcement comprising an inside surface and an outside surface; and an outside layer on the outside surface of the fibrous reinforcement and/or an inside layer on the inside surface of the fibrous reinforcement; wherein the outside layer and/or the inside layer comprises regenerated cellulose. Such a cellulose-based food casings may also be called a single layer viscose casing or a double layer viscose casing. In this context, the term "single layer viscose casing" or "SVC" should be understood as referring to a cellulose-based food casing comprising a fibrous reinforcement and an outside layer or an inside layer comprising regenerated cellulose. In other words, a single layer viscose casing comprises a fibrous reinforcement comprising an inside surface and an outside surface, wherein the inside surface or the outside surface is impregnated with viscose by applying viscose to either the inside surface or the outside surface of the fibrous reinforcement only. In this context, the term "double layer viscose casing" or "DVC" should be understood as referring to a cellulose-based food casing comprising an inside layer, an outside layer and a fibrous reinforcement between the outside layer and inside layer, wherein the outside layer and inside layer comprise regenerated cellulose. In other words, a double layer viscose casing comprises a fibrous reinforcement impregnated with viscose by applying viscose to both sides of the fibrous reinforcement.

Tubular cellulose-based food casings such as those described above may have a predetermined recommended maximum stuffing diameter, i.e. a recommended maximum diameter it can reach upon being radially expanded (e.g. during stuffing or inflating) without an increased risk of being ruptured. Manufacturers of cellulose-based casings typically indicate such a recommended maximum stuffing diameter, or it may be predetermined based on casing characteristics and experimental tests.

The holder configured to receive a sausage stick enclosed in a casing and move together with the sausage stick thereby received from an inflation starting position to an inflation end position may, in principle, comprise any structure capable of receiving and moving a sausage stick. For instance, the holder may comprise e.g. a robot claw or hand or other structure suitable for grabbing or configured to grab a sausage stick. Various other embodiments of the holder are described in this specification. An individual holder may typically be configured to receive and move a single sausage stick at a time, but an individual holder may also be configured to receive and move two or more sausage sticks at a time, depending on the size and shape of the holder.

The holder may also have an elongated slot configured to receive and hold the sausage stick enclosed in the casing. A slot thus defines a space configured to receive and accommodate the sausage stick enclosed in the casing. The shape and size of the slot may be such that it is capable of receiving an elongated sausage stick, the sausage stick having typically a circular or essentially circular cross-section; however, sausage sticks may also have a cross-section other than circular, such as a rectangular cross-section, and in such a case the shape and size of the slot may be configured accordingly. The slot may thus be e.g. an arcuate recess, a groove or channel into which the sausage stick enclosed in a casing may fit when the apparatus is in use. The slot may, for instance, have a bottom of a semi-circular or a U-shaped cross-section. The slot may also have a circular cross-section, so that the slot is configured to enclose and surround essentially the entire surface of the casing enclosing the sausage stick.

The holder may also be e.g. a conveyor or a slot on a conveyor. The conveyor may comprise e.g. a bed or a belt and cleats or belt slots forming a slot configured to receive and hold the sausage stick enclosed in the casing.

The holder may also be operatively connected with means for moving the holder. Such means may comprise e.g. a motor, a conveyor, a shaft or another apparatus suitable for moving or configured to move the holder.

The inflating needle may be connected or coupled to the holder or slot. The inflating needle may be operatively or physically connected or coupled to the holder or slot, for instance by a suitable support member. The inflating needle may also be integrated in the holder or slot. The inflating needle may also not be physically connected or coupled to the holder or slot, provided it is configured to follow the holder or slot immoveably relative to the holder or slot moving together with the sausage stick from the inflation starting position to the inflation end position. The inflating needle may be e.g. configured to be controlled by an automation system or a computer that is configured to control the movement of the holder and/or slot and of the inflating needle simultaneously so that the inflating needle follows the holder or slot immoveably relative to the holder or slot moving together with the sausage stick from the inflation starting position to the inflation end position.

The holder or slot may also be removable and/or replaceable. For instance, a holder having a slot of a particular size may be replaceable by another holder having a slot of a different size and/or shape, so as to accommodate sausage sticks of different sizes and/or shapes.

The inflating needle or the inflating needles may also be removable and/or replaceable. For instance, the apparatus may comprise a plurality of inflating needles that are removable, reattachable and replaceable. This may allow selecting the number of inflating needles for each holder/slot depending on various conditions. For instance, for casings that are relatively easily releasable from the surface of the sausage stick, one inflating needle may be provided for each slot, and it may still be sufficient to inflate and release the casing. In such a case, the volume of pressurized gas required may be minimized, and any possible damage to the surface of the sausage stick caused by the inflating needle may also be minimized. For casings that are difficult to release, e.g. casings that adhere strongly to the surface of the sausage stick, two or more inflating needles may be provided.

An elongated holder having an elongated slot may comprise a plurality of inflating needles disposed along the length of the holder and/or slot. In embodiments in which inflating needles are removable and/or replaceable, the holder and/or slot may have a plurality of mounting slots for mounting inflating needles along the length of the slot. This may allow flexibility in adding and removing inflating needles as desired. Further, the inflating needles may be disposed in positions where additional inflation efficiency could be beneficial, e.g. in positions configured to be close to parts of a sausage stick in which the casing adheres to the surface of the sausage stick most strongly. In such embodiments, a gas channel may extend along the length of the elongated holder and/or slot and be configured to convey pressurized gas to the inflating needles disposed along the length of the slot.

The holder or slot configured to receive the sausage stick enclosed in the casing may have a support surface configured to face the casing. The support surface may be configured to face essentially the entire surface of the casing enclosing the sausage stick or at least a part of the surface of the casing.

The holder or slot configured to receive the sausage stick enclosed in the casing may have a support surface configured to face the casing, and the inflating needle may protrude or may be configured to protrude from the support surface. The inflating needle may thus be mounted in the holder or slot so that it may protrude from the support surface, at least when the apparatus is in use. As the inflating needle protrudes from the support surface of the holder or slot, a sausage stick enclosed in a casing may then make contact with and be penetrated by the inflating needle upon being received by the holder or slot and may remain in contact with and be penetrated by the inflating needle until discharged from the holder or slot. This may allow inflating the casing for the entire duration of the time the sausage stick remains in the holder or slot. The dimensions of the inflating needle may be such that it is configured to penetrate the casing (but not necessarily the sausage stick, so as not to damage the sausage stick) and to inflate the casing. In an embodiment, the inflating needle is configured to penetrate the casing and an end portion of the sausage stick to inflate the casing as described above.

The holder or slot may be configured to move together with the sausage stick in a direction parallel to the longitudinal axis of the sausage stick. The holder or slot may also be configured to move together with the sausage stick in a direction perpendicular to the longitudinal axis of the sausage stick, i.e. laterally. The holder or the slot may also be elongated, in which case the holder or slot may be configured to move together with the sausage stick in a direction parallel or perpendicular to the longitudinal axis of the holder or slot.

The holder may, in principle, be configured to move in any direction, for instance in a horizontal, vertical or inclined direction or along a horizontal, vertical or inclined path. The holder may also be configured to move along a curved or essentially circular path.

In the context of this specification, the term "a sausage stick" may be understood as referring to one or more sausage sticks, or even to a plurality of sausage sticks. Likewise, in the context of this specification, the term "a casing" may be understood as referring to one or more casings, or to a plurality of casings. In the context of this specification, the term "a holder", "a slot" or "an inflating needle" may also be understood as referring to one or more holders, slots or inflating needles.

The apparatus may be suitable for inflating a plurality of casings, each casing enclosing a sausage stick, wherein the apparatus comprises
 a plurality of holders, wherein each holder is configured to receive a sausage stick enclosed in a casing and move together with the sausage stick thereby received from an inflation starting position to an inflation end position, and
 a plurality of inflating needles, wherein each inflating needle is configured to penetrate the casing of a sausage stick and to follow one or at least one of the holders immoveably relative to the holder moving together with the sausage stick from the inflation starting position and the inflation end position to inflate the casing between the inflation starting position and the inflation end position.

A plurality of holders or slots and a plurality of inflating needles may provide improved throughput, as a plurality of casings may be inflated simultaneously. In such an embodiment, at least one or each of the inflating needles may be any inflating needle described in this specification.

The apparatus may comprise a rotatable conveyor, the conveyor comprising a plurality of holders or slots, wherein each holder or slot is configured to move together with the sausage stick along a curved path. Such a rotatable conveyor may also be called a rotatable revolver conveyor.

Such a rotatable revolver conveyor may be rotatable around a shaft. For instance, individual holders or slots may be connected to a central portion or shaft that may be rotatable e.g. by a suitable motor. It may also be generally cylindrical, for instance a generally cylindrical drum having a plurality of slots or recesses. Such a rotatable revolver conveyor may require a relatively small space.

The shape and size of the elongated slot may be such that the support surface is configured to restrict the radial expansion of the casing being inflated, the slot being thereby configured to reduce the risk of overinflating the casing. While the casing may still be able to burst if rapidly or excessively inflated, depending on the exact shape and size of the slot, the slot may nonetheless prevent the casing from expanding radially too rapidly and/or excessively and may therefore reduce the propensity of the casing to burst while inflating the casing. As the slot can restrict the radial expansion of the casing being inflated, a smaller volume of pressurized gas may be required to release the casing; this may subsequently reduce the costs relating to providing the pressurized gas. It may also reduce the time required for inflating the casing.

The elongated slot may be configured to receive a sausage stick enclosed in a casing having a predetermined recommended maximum stuffing diameter.

The elongated slot may have a bottom of a semi-circular cross-section, wherein the radius of the semi-circular cross-section of the bottom of the slot may be smaller than or equal to half the recommended maximum stuffing diameter of the casing enclosing the sausage stick which the slot is configured to receive.

The elongated slot may have a bottom of a semi-circular cross-section, the slot further being formed of side supports extending in the direction opposite to the bottom of the slot and separated by a distance of each other. The support surface may thus be formed of the surface of the bottom and further of the surfaces of the side supports facing each other. The radius of the semi-circular cross-section of the bottom of the slot may be smaller than or equal to half the recommended maximum stuffing diameter and the distance between the side supports is smaller than or equal to the recommended maximum stuffing diameter of the casing enclosing the sausage stick which the slot is configured to receive.

As an example, the casing may have a predetermined recommended maximum stuffing diameter of 70-74 mm, for instance 72 mm. In such an example the diameter of the sausage stick may be e.g. about 62-64 mm. In such an example, the radius of the semi-circular cross-section of the bottom of the slot may be e.g. 0.5-2.5 mm smaller than or equal to half the recommended maximum stuffing diameter, e.g. in the range of 32.5-37 mm, or 33.5-36 m. The distance between the side supports may be e.g. in the range of 65-74 mm, or 67-72 mm.

As further examples, Table 1 indicates various cellulose-based casings (SVC or DVC casings) having different recommended maximum stuffing diameters and examples of suitable radii of the semi-circular cross-section of the bottom of the slot and distances between the side supports. The trade size (also referred to as the caliber) may refer to the diameter of the casing when dry (typically after manufacture, but prior to soaking and stuffing). In general, suitable cellulose-based casings may have a recommended maximum stuffing diameter in the range of 28-252 mm (corresponding trade size in the range of 28-245 mm). The radii and distances may also differ from these exemplary values, provided they are such that the support surface is configured to restrict the radial expansion of the casing being inflated, the slot being thereby configured to reduce the risk of overinflating the casing. The diameter of the sausage stick may depend, in addition to the recommended maximum stuffing diameter of the casing, on various other factors, such as the decrease of the diameter of the sausage stick during drying etc., but it tends to be smaller than the trade size of the casing.

TABLE 1

Exemplary radii of the semi-circular cross-section of the bottom of the slot and distances between the side supports suitable for casings having various different recommended maximum stuffing diameters.

| Trade size (mm) | Recommended maximum stuffing diameter (mm) | Radius of the semi-circular cross-section of the bottom of the slot (mm) | Distance between the side supports (mm) |
|---|---|---|---|
| 28 | 28 | 11.5-14 | 23-28 |
| 47.8 | 52.5 | 22-26.3 | 44-52.5 |
| 65 | 70 | 29-35 | 58-70 |
| 90 | 101 | 42-50.5 | 84-101 |

The apparatus may comprise
a plurality of slots, each slot configured to receive a sausage stick enclosed in a casing and move together with the sausage stick thereby received from an inflation starting position to an inflation end position; and
a covering configured to cover at least a part of at least one slot to thereby prevent the sausage stick received in the slot from being discharged from the slot.

The covering may then leave at least one of the other slots unobstructed so as to receive and/or discharge a second sausage stick enclosed in a casing.

The covering may be e.g. a cover plate.

The apparatus comprising the covering may also comprise a rotatable revolver conveyor as described in this specification. In such an embodiment, the covering may cover a first part of the rotatable revolver conveyor, e.g. one or more of the slots, and leave a second part of the rotatable revolver conveyor, e.g. the remaining slots, unobstructed. In such an apparatus, the covering may help to retain sausage sticks in the slots covered by the covering while the revolver conveyor rotates, when in use. Sausage sticks may then be received and discharged by slots that are unobstructed by the covering. A surface of the covering may form a part of the support surface. The covering may thus also be configured to restrict, together with the support surface provided by the slot, the radial expansion of the casing being inflated.

Inflated casings may then be cut open and removed from the enclosed sausage sticks manually, for instance by gripping and pulling the cut casing off or by simply lifting the sausage stick out of the cut casing. The inflated casings may also be removed using a suitable apparatus.

An apparatus for removing a casing from a sausage stick enclosed in the casing is also disclosed. The apparatus comprises the apparatus for inflating the casing enclosing the sausage stick according to one or more of the embodiments described in this specification. The apparatus for removing the casing from a sausage stick enclosed in the casing may further comprise one or more of the following, or any combination thereof:
an input apparatus configured to feed the sausage stick enclosed in the casing into the apparatus for inflating the casing;
a cutting apparatus configured to cut open the inflated casing;
a stripping apparatus configured to strip the casing off the sausage stick;
an apparatus for detecting any remaining fragments of the casing left on the surface of the sausage stick after stripping.

The input apparatus may be configured to feed, i.e. to position and load, the sausage stick enclosed in the casing to the holder or the slot when the holder or slot is in the receiving position.

It may be e.g. an input frame, table or conveyor or other suitable apparatus that is configured to place, push or drop the sausage stick into the holder or slot.

The cutting apparatus may comprise e.g. a knife, for instance a rotatable knife. The cutting and stripping apparatuses may also be e.g. similar to those described in U.S. Pat. No. 2,424,346. Various cutting and stripping apparatuses suitable for cutting and stripping inflated casings are known in the art.

The apparatus for removing the casing from the sausage stick enclosed in the casing may further comprise a transport apparatus, such as a conveyor, or a plurality of conveyors, configured to transport the sausage stick from the apparatus for inflating the casing enclosing the sausage stick, for instance to the cutting apparatus and/or to the stripping apparatus.

The apparatus for removing the casing may further comprise an apparatus for detecting any remaining fragments of the casing left on the surface of the sausage stick after stripping. For use in such an embodiment, the casing may comprise an ultraviolet-detectable component; suitable casings are e.g. those described in publication EP 2796048 (e.g. paragraphs [0010]-[0070] and [0100]-[0117]). The apparatus may comprise an ultraviolet light source, for instance an ultraviolet lamp, a blacklight, a fluorescent lamp, a gas-discharge lamp, a LED or a laser emitting ultraviolet light. The ultraviolet light source may be configured to illuminate the surface of the stripped sausage stick to thereby allow detecting visible light emitted by the ultraviolet-detectable component in any remaining fragments of the casing left on the surface of the sausage stick. The visible light emitted may be detected visually, e.g. by an operator. Alternatively, the apparatus may further comprise a light sensor for detecting or configured to detect the visible light emitted by the ultraviolet-detectable component.

A method for inflating a casing enclosing a sausage stick is also disclosed, the method comprising
providing a sausage stick enclosed in a casing;
penetrating the casing with an inflating needle; and
moving the sausage stick enclosed in the casing from an inflation starting position to an inflation end position;
wherein the inflating needle follows the sausage stick immoveably relative to the sausage stick moving from the inflation starting position to the inflation end position, the inflating needle thereby inflating the penetrated casing between the inflation starting position and the inflation end position.

Thus the sausage stick and the inflating needle both move, but the inflating needle moves in such a manner that it moves simultaneously with the sausage stick, as opposed to being stationary, so that the inflating needle follows the sausage stick and while moving, i.e. following the sausage stick, remains immoveable relative to the sausage stick. As the inflating needle moves and follows the sausage stick, as opposed to being stationary, there is no need to stop moving the sausage stick, e.g. on a conveyor or processing line, for the inflating needle to inflate the casing; instead, the sausage stick may move while the casing is being inflated, and may even move more or less continuously. This may be particularly beneficial e.g. in a process line intended for high throughput, as delays resulting from discontinuing the movement of the sausage sticks in such a process line for the purpose of inflating the casings may be shortened or even completely avoided.

The method may comprise receiving a sausage stick enclosed in a casing;
penetrating the casing with an inflating needle;
moving the sausage stick enclosed in the casing from an inflation starting position to an inflation end position,
wherein the inflating needle follows the sausage stick immoveably relative to the sausage stick moving from the inflation starting position to the inflation end position, the inflating needle thereby inflating the penetrated casing between the inflation starting position and the inflation end position; and
discharging the inflated sausage stick.

The method may be performed using an apparatus for inflating a casing enclosing a sausage stick according to one or more embodiments described in this specification.

The method may thus comprise receiving the sausage stick enclosed in the casing in a holder; penetrating the casing with an inflating needle; and moving the holder and the sausage stick thereby received from an inflation starting position to an inflation end position, wherein the inflating needle follows the sausage stick and the holder immoveably relative to the sausage stick and the holder moving from the inflation starting position to the inflation end position, the inflating needle thereby inflating the penetrated casing between the inflation starting position and the inflation end position.

The holder, slot and/or the inflating needle may, in the context of the method, be any holder, slot or inflating needle described in this specification.

The inflating needle may in principle be any sharp object capable of penetrating a casing enclosing a sausage stick and having a conduit suitable for conveying or configured to convey pressurized gas into the penetrated casing and thereby inflate the casing. The inflating needle may be, for instance, a hollow needle, a syringe, a pin or a nozzle. Various examples of such an inflating needle are described later in this specification. The inflating needle may be in fluid connection to a source of gas, such as pressurized air. The apparatus may thus comprise one or more gas channels or ducts configured to convey gas to the inflating needle (or to a plurality of inflating needles).

The inflating needle may have one or more output orifices through which the pressurized gas may be conveyed into the penetrated casing.

The inflating needle may be operatively connected with means for moving the inflating needle, such as a motor, a conveyor, a bar for movement in the direction of movement of the holder, or another apparatus suitable for or configured to move the inflating needle.

The dimensions of the inflating needle may be such that it may penetrate the casing (but not necessarily the sausage stick, so as not to damage the sausage stick) and inflate the casing.

In an embodiment, the method comprises penetrating the casing but not the sausage stick with the inflating needle. In another embodiment, the method comprises penetrating the casing and an end portion of the sausage stick with the inflating needle. In an embodiment, the method comprises penetrating the casing and the end portion of the sausage stick with the inflating needle at a distance from the edge of the end portion, the distance being equal to or greater than the thickness of the needle or equal to or greater than two times the thickness of the needle. The method may also comprise cutting off the end portion after inflating.

The gas for inflating the casing may, in principle, be any gas, for instance any inert gas. Air may be commonly used, but other gases such as nitrogen or argon or any mixtures of such gases may as well be used.

The method may be particularly suitable for inflating a casing enclosing a dry sausage.

The time during which the inflating needle is inflating the penetrated casing and during which the sausage stick is moving between the inflation starting position and the inflation end position may be adjusted and/or selected so as to be sufficient e.g. to fully release the casing. The pressure of the gas may also be adjusted and/or selected so as to be sufficient e.g. to fully release the casing. An operator can predetermine appropriate parameters or may adjust them when applying the method.

The casing may be any casing described in this specification. The casing may be a tubular artificial food casing, for instance a tubular artificial food casing comprising or formed of regenerated cellulose, plastic and/or textile. The casing may also be suitable for dry sausages. Casings comprising regenerated cellulose, also commonly referred to as cellulose-based food casings, may comprise at least one layer of regenerated cellulose. Such a casing may also comprise a fibrous reinforcement. The fibrous reinforcement may be tubular. A fibrous reinforcement may be provided e.g. by shaping a fiber paper to form a tube. The fibrous reinforcement may then be impregnated or coated with viscose, which forms a layer of regenerated cellulose when coagulated.

The tubular artificial food casing may comprise a fibrous reinforcement comprising an inside surface and an outside surface; and an outside layer on the outside surface of the fibrous reinforcement and/or an inside layer on the inside surface of the fibrous reinforcement; wherein the outside layer and/or the inside layer comprises regenerated cellulose. Such a cellulose-based food casings may also be called a single layer viscose casing or a double layer viscose casing.

The holder may, in principle, comprise any structure capable of receiving and moving a sausage stick. For instance, the holder may comprise e.g. a robot claw or hand or other structure or suitable for grabbing or configured to grab a sausage stick. Various other embodiments of the holder are described in this specification. An individual holder may typically receive and move a single sausage stick at a time, but an individual holder may also receive and move two or more sausage sticks at a time, depending on the size and shape of the holder.

The holder may also have an elongated slot configured to receive and hold the sausage stick enclosed in the casing. A slot thus defines a space configured to receive and accommodate the sausage stick enclosed in the casing. The shape and size of the slot may be such that it is capable of receiving an elongated sausage stick, the sausage stick having typically a circular or essentially circular cross-section; however, sausage sticks may also have a cross-section other than circular, such as a rectangular cross-section, and in such a case the shape and size of the slot may be configured accordingly. The slot may thus be e.g. an arcuate recess or groove. The slot may, for instance, have a bottom of a semi-circular cross-section. The slot may also have a circular cross-section, so that the slot may enclose and surround essentially the entire surface of the casing enclosing the sausage stick.

The holder may also be e.g. a conveyor or a slot on a conveyor. The conveyor may comprise e.g. a bed or a belt and cleats or belt slots forming a slot configured to receive and hold the sausage stick enclosed in the casing.

The holder may also be operatively connected with means for moving the holder, such as a motor, a conveyor, a shaft or another apparatus suitable for or configured to move the holder.

The inflating needle may be connected or coupled to the holder or slot. The inflating needle may be operatively or physically connected or coupled to the holder or slot. The inflating needle may also not be physically connected or coupled to the holder or slot, provided it follows the holder or slot immoveably relative to the holder or slot moving together with the sausage stick from the inflation starting position to the inflation end position. The inflating needle may be e.g. controlled by an automation system or a computer that controls the movement of the holder or slot and thereby the movement of the sausage stick and of the inflating needle simultaneously so that the inflating needle follows the sausage stick, holder and/or slot immoveably relative to the sausage stick, holder and/or slot moving from the inflation starting position to the inflation end position.

The holder or slot may also be removable and/or replaceable. For instance, a holder having a slot of a particular size may be replaced by another holder having a slot of a different size and/or shape, so as to accommodate a sausage stick of a different size and/or shape.

The inflating needle or the inflating needles may also be removable and/or replaceable. For instance, the apparatus may comprise a plurality of inflating needles that are removable, reattachable and replaceable. This may allow selecting the number of inflating needles for each holder/slot depending on various conditions. For instance, for casings that are relatively easily releasable from the surface of the sausage stick, one inflating needle may be provided for each slot, and it may still be sufficient to inflate and release the casing. In such a case, the volume of pressurized gas required may be minimized, and any possible damage to the surface of the sausage stick caused by the inflating needle may also be minimized. For casings that are difficult to release, e.g. casings that adhere strongly to the surface of the sausage stick, two or more inflating needles may be provided.

The method may thus comprise adjusting (increasing or reducing) the number of inflating needles prior to penetrating the casing with the inflating needles.

An elongated holder having an elongated slot may comprise a plurality of inflating needles disposed along the length of the holder and/or slot. In embodiments in which inflating needles are removable and/or replaceable, the holder and/or slot may have a plurality of mounting slots for mounting inflating needles along the length of the slot, and the number of inflating needles mounted may be adjusted (increased or reduced) prior to penetrating the casing with the inflating needle(s). This may allow flexibility in adding and removing inflating needles as desired. Further, the inflating needles may be disposed in positions where additional inflation efficiency could be beneficial, e.g. in positions configured to be close to parts of a sausage stick in which the casing adheres to the surface of the sausage stick most strongly. In such embodiments, a gas channel may extend along the length of the elongated holder and/or slot and be configured to convey pressurized gas to the inflating needles disposed along the length of the slot.

The holder or slot receiving the sausage stick enclosed in the casing may have a support surface configured to face the casing, and the inflating needle may protrude from the support surface. The inflating needle may thus be mounted in the holder or slot so that it may protrude from the support surface. As the inflating needle protrudes from the support surface of the holder or slot, a sausage stick enclosed in a casing may then make contact with and be penetrated by the inflating needle upon being received by the holder or slot and may remain in contact with and be penetrated by the inflating needle until discharged from the holder or slot. This may allow inflating the casing for the entire duration of the time the sausage stick remains in the holder or slot. The dimensions of the inflating needle may be such that it is configured to penetrate the casing (but not necessarily the sausage stick, so as not to damage the sausage stick) and to inflate the casing.

The method may comprise moving the sausage stick enclosed in the casing in a direction parallel to the longitudinal axis of the sausage stick. The method may also comprise moving the sausage stick enclosed in the casing in a direction perpendicular to the longitudinal axis of the sausage stick, i.e. laterally.

As the holder or slot may also be elongated, the holder or slot may also be moved together with the sausage stick in a direction parallel or perpendicular to the longitudinal axis of the holder or slot.

The sausage stick may, in principle, be moved in any direction, for instance in a horizontal, vertical or inclined direction or along a horizontal, vertical or inclined path. The sausage stick may also be moved along a curved or essentially circular path.

The method may be suitable for inflating a plurality of casings, each casing enclosing a sausage stick. Such a method may comprise providing a plurality of sausage sticks, each sausage stick enclosed in a casing, and penetrating each casing with an inflating needle. A plurality of inflating needles may be also used, one or more inflating needles penetrating a single casing.

Such a method may also be performed using an apparatus comprising a plurality of holders, wherein each holder may receive a
    sausage stick enclosed in a casing and be moved together with the sausage stick thereby received from an inflation starting position to an inflation end position, and a plurality of inflating needles, wherein each inflating needle may penetrate the casing of a sausage stick and follow one or at least one of the holders immoveably relative to the holder moving together with the sausage stick from the inflation starting position and the inflation end position to inflate the casing between the inflation starting position and the inflation end position.

A plurality of holders or slots and a plurality of inflating needles may provide improved throughput, as a plurality of casings may be inflated simultaneously. In such an embodiment, at least one or each of the inflating needles may be any inflating needle as described in this specification.

The method may comprise moving the sausage stick along a curved path.

The method may also be performed using an apparatus comprising a rotatable revolver conveyor, the conveyor comprising a plurality of holders or slots, wherein each holder or slot moves together with the sausage stick along a curved or essentially circular path.

Such a rotatable revolver conveyor may be rotated around a shaft. For instance, individual holders or slots may be connected to a central portion or shaft that may be rotated e.g. by a suitable motor. It may also be generally cylindrical, for instance a generally cylindrical drum having a plurality of slots or recesses. Such a rotatable revolver conveyor and operating the same may require a relatively small space.

The method may comprise
receiving the sausage stick enclosed in the casing in a slot having a support surface facing the casing enclosing the sausage stick received therein;
wherein upon inflating the casing, the support surface restricts the radial expansion of the casing being inflated and thereby reduces the risk of overinflating the casing.

The sausage stick provided may be enclosed in a casing having a predetermined recommended maximum stuffing diameter. The method may then comprise
receiving the sausage stick in a slot having a support surface facing the casing enclosing the sausage stick received therein, the slot having a diameter smaller than or equal to the predetermined recommended maximum stuffing diameter of the casing;
wherein upon inflating the casing, the support surface restricts the radial expansion of the casing being inflated and thereby reduces the risk of overinflating the casing.

The slot may be an elongated slot having a bottom of a semi-circular or U-shaped cross-section. The slot may further be formed of side supports extending in the direction opposite to the bottom of the slot and separated by a distance from each other. The support surface may thus be formed of the surface of the bottom and optionally further of the surfaces of the side supports facing each other. The radius of the semi-circular cross-section of the bottom of the slot may then be smaller than or equal to half the recommended maximum stuffing diameter. The distance between the side supports may be smaller than or equal to the recommended maximum stuffing diameter of the casing enclosing the sausage stick received by the slot.

As an example, the casing may have a predetermined recommended maximum stuffing diameter of 70-74 mm, for instance 72 mm. In such an example the diameter of the sausage stick may be e.g. about 62-64 mm. In such an example, the radius of the semi-circular cross-section of the bottom of the slot may be e.g. 0.5-2.5 mm smaller than or equal to half the recommended maximum stuffing diameter, e.g. in the range of 32.5-37 mm, or 33.5-36 m. The distance between the side supports may be e.g. in the range of 65-74 mm, or 67-72 mm. The values might also be e.g. those described in Table 1.

The method may also be performed using an apparatus comprising a plurality of slots and a covering configured to cover at least a part of at least one slot, wherein receiving a sausage stick enclosed in a casing in each slot; wherein the covering prevents the sausage stick received in the slot, at least a part of which is covered, from being discharged from the slot.

The covering may then leave at least one of the other slots unobstructed so as to receive and/or discharge a second sausage stick enclosed in a casing.

The covering may be e.g. a cover plate.

The apparatus comprising the covering may also comprise a rotatable revolver conveyor as described in this specification. In such an embodiment, the covering may cover a first part of the rotatable revolver conveyor, e.g. one or more of the slots, and leave a second part of the rotatable revolver conveyor, e.g. the remaining slots, unobstructed. When the method is performed using such an apparatus, the covering may retain sausage sticks in the slots covered by the covering while the revolver conveyor rotates. Sausage sticks may then be received by and discharged from one or more of the slots that are unobstructed by the covering.

A method for removing a casing from a sausage stick enclosed in the casing is also disclosed, the method comprising inflating the casing enclosing the sausage stick according to one or more of the embodiments of the method described in this specification; optionally cutting open the inflated casing; and stripping the inflated casing off the sausage stick.

The method for removing the casing may comprise providing a sausage stick enclosing in a casing comprising an ultraviolet-detectable component; inflating the casing according to one or more embodiments for inflating the casing described in this specification; optionally cutting open the inflated casing; stripping the inflated casing off the sausage stick; illuminating the surface of the stripped sausage stick with an ultraviolet light source; and locating any remaining fragment of the casing on the surface of the stripped sausage stick by detecting visible light emitted by the ultraviolet-detectable component.

For use in such a method, the casing may comprise an ultraviolet-detectable component; suitable casings are e.g. those described in publication EP 2796048 (e.g. paragraphs [0010]-[0070] and [0100]-[0117]). As the ultraviolet light source, for instance an ultraviolet lamp, a blacklight, a fluorescent lamp, illuminates the surface of the sausage stick, any visible light emitted by the ultraviolet-detectable component in any remaining fragments of the casing left on the surface of the sausage stick may be detected visually, e.g. by an operator or by a sensor for detecting the visible light emitted by the ultraviolet-detectable component.

In a second aspect, an apparatus for inflating a casing enclosing a sausage stick is disclosed, the apparatus comprising
a holder configured to receive the sausage stick enclosed in the casing, wherein the holder has an elongated slot configured to receive and hold the sausage stick enclosed in the casing; and
an inflating needle configured to penetrate the casing of the sausage stick received by the holder and to inflate the casing;

wherein the elongated slot has a support surface configured to face the casing, and the shape and size of the elongated slot are such that the support surface is configured to restrict the radial expansion of the casing being inflated, the slot being thereby configured to reduce the risk of overinflating the casing.

The shape and size of the slot may be such that it is capable of receiving an elongated sausage stick, the sausage stick having typically a circular or essentially circular cross-section; however, sausage sticks may also have a cross-section other than circular, such as a rectangular cross-section, and in such a case the shape and size of the slot may be configured accordingly. The slot may thus be e.g. an arcuate recess, a groove or channel into which the sausage stick enclosed in a casing when the apparatus is in use. The slot may, for instance, have a bottom of a semi-circular or a U-shaped cross-section. The slot may also have a circular cross-section, so that the slot is configured to enclose and surround essentially the entire surface of the casing enclosing the sausage stick.

The support surface may be configured to face essentially the entire surface of the casing enclosing the sausage stick or at least a part of the surface of the casing.

The elongated slot may be configured to receive a sausage stick enclosing a casing having a predetermined recommended maximum stuffing diameter.

The elongated slot may have a bottom of a semi-circular cross-section, wherein the radius of the semi-circular cross-section of the bottom of the slot may be smaller than or equal to half the recommended maximum stuffing diameter of the casing enclosing the sausage stick which the slot is configured to receive.

The elongated slot may have a bottom of a semi-circular cross-section, the slot further being formed of side supports extending in the direction opposite to the bottom of the slot and separated by a distance of each other. The support surface may thus be formed of the surface of the bottom and of the surfaces of the side supports facing each other. The radius of the semi-circular cross-section of the bottom of the slot may be smaller than or equal to half the recommended maximum stuffing diameter and the distance between the side supports is smaller than or equal to the recommended maximum stuffing diameter of the casing enclosing the sausage stick which the slot is configured to receive.

As an example, the casing may have a predetermined recommended maximum stuffing diameter of 70-74 mm, for instance 72 mm. In such an example the diameter of the sausage stick may be e.g. about 62-64 mm. In such an example, the radius of the semi-circular cross-section of the bottom of the slot may be e.g. 0.5-2.5 mm smaller than or equal to half the recommended maximum stuffing diameter, e.g. in the range of 32.5-37 mm, or 33.5-36 m. The distance between the side supports may be e.g. in the range of 65-74 mm, or 67-72 mm. The values might also be e.g. those described in Table 1.

In a second aspect, a method for inflating a casing enclosing a sausage stick is disclosed, the method comprising
  providing a sausage stick enclosed in a casing;
  receiving the sausage stick in a slot having a support surface facing the casing enclosing the sausage stick received therein;
  penetrating the casing with an inflating needle, the inflating needle thereby inflating the penetrated casing;
  wherein upon inflating the casing, the support surface restricts the radial expansion of the casing being inflated and thereby reduces the risk of overinflating the casing.

The method may also comprise
  providing a sausage stick enclosed in a casing having a predetermined recommended maximum stuffing diameter;
  receiving the sausage stick in a slot having a support surface facing the casing enclosing the sausage stick received therein, the slot having a diameter smaller than or equal to the predetermined recommended maximum stuffing diameter of the casing;
  penetrating the casing with an inflating needle, the inflating needle thereby inflating the penetrated casing;
  wherein upon inflating the casing, the support surface restricts the radial expansion of the casing being inflated and thereby reduces the risk of overinflating the casing.

The slot, inflating needle, casing and other features may, in the context of the apparatus or method according to the second aspect, be any slot, inflating needle, casing or other feature described in this specification.

A slot thus defines a space configured to receive and accommodate the sausage stick enclosed in the casing. The shape and size of the slot may be such that it is capable of receiving an elongated sausage stick, the sausage stick having typically a circular or essentially circular cross-section; however, sausage sticks may also have a cross-section other than circular, such as a rectangular cross-section, and in such a case the shape and size of the slot may be configured accordingly. The slot may thus be e.g. an arcuate recess or groove. The slot may, for instance, have a bottom of a semi-circular cross-section. The slot may also have a circular cross-section, so that the slot is configured to enclose and surround essentially the entire surface of the casing enclosing the sausage stick.

The slot may be an elongated slot having a bottom of a semi-circular or U-shaped cross-section. The slot may further be formed of side supports extending in the direction opposite to the bottom of the slot and separated by a distance from each other. The support surface may thus be formed of the surface of the bottom and optionally further of the surfaces of the side supports facing each other. The radius of the semi-circular cross-section of the bottom of the slot may then be smaller than or equal to half the recommended maximum stuffing diameter. The distance between the side supports may be smaller than or equal to the recommended maximum stuffing diameter of the casing enclosing the sausage stick received by the slot.

As an example, the casing may have a predetermined recommended maximum stuffing diameter of 70-74 mm, for instance 72 mm. In such an example the diameter of the sausage stick may be e.g. about 62-64 mm. In such an example, the radius of the semi-circular cross-section of the bottom of the slot may be e.g. 0.5-2.5 mm smaller than or equal to half the recommended maximum stuffing diameter, e.g. in the range of 32.5-37 mm, or 33.5-36 m. The distance between the side supports may be e.g. in the range of 65-74 mm, or 67-72 mm. The values might also be e.g. those described in Table 1.

The embodiments described hereinbefore may be used in any combination with each other. Several of the embodiments may be combined together to form a further embodiment. An apparatus or a method may comprise at least one of the embodiments described hereinbefore.

A technical effect of one or more embodiments described in this specification is that it may be possible to inflate a casing longer without jeopardizing the output. Large sausage sticks, in particular dry sausages, may require a relatively long inflating time to be released completely. Thereby the release of the casing from the surface of the sausage stick may be improved.

A technical effect of one or more embodiments described in this specification is that it may be possible to inflate even casings adhering quite strongly to the surface of the sausage sticks. Thus casings may be removed efficiently even from sausages for which pre-release is weak or which do not exhibit pre-release. In the context of this specification, the term "pre-release" may be understood as referring to the phenomenon where the casing separates at least to some extent from the surface of a sausage stick during the ripening and/or drying of the sausage product, i.e. prior to inflating (and stripping off) the casing. The extent of pre-release may typically vary between casings and/or sausage products having different characteristics, but may also vary between batches of casings and/or sausage products and between different parts of an individual sausage stick. For instance, casings often adhere to the surfaces of sausage sticks close to the clipped ends more strongly than to the surfaces close to the middle of the sausage sticks. While pre-release may be beneficial for stripping and peeling off casings, it may also hamper the processes of ripening, drying and/or stripping or peeling the sausage products.

A technical effect of one or more embodiments described in this specification is that the apparatus and method may not be particularly sensitive to fluctuations in adhesion and pre-release or other quality issues.

A technical effect of one or more embodiments described in this specification is that the apparatus may take up little space. The apparatus and the method may also be efficient.

A technical effect of one or more embodiments described in this specification is that the apparatus and the method may be used to inflate and remove casings off sausage sticks of different diameters. Further, as the holders/slots may be removable and replaceable, it is possible to replace the holders/slots with others suitable for sausage sticks of different diameters.

A technical effect of one or more embodiments described in this specification is that the apparatus and the method may be relatively robust and reliable.

A technical effect of one or more embodiments described in this specification is that they may reduce the risk of overinflating casings and may even prevent casings from over-inflating. Therefore it may be easier for an operator to adjust the gas pressure and inflating time required for casing release, as the casings are not as prone to bursting as they might otherwise be prone to do if the inflating pressure and time are not optimal. This may further improve peeling/stripping results, as casings that explode or burst open upon inflating are not always fully released. Further, a smaller volume of pressurized gas may be required to release the casing; this may reduce the costs relating to providing the pressurized gas. It may also reduce the time required for inflating the casing.

A technical effect of one or more embodiments described in this specification is that the apparatus and the method may be suitable also for large sausages and casings which have a large surface area to be released.

A technical effect of one or more embodiments described in this specification is that the apparatus and the method may be suitable for inflating casings enclosing sausage sticks, the diameter of which may vary along the length of the sausage stick.

A technical effect of one or more embodiments described in this specification is that the positions of the inflating needles may be adjusted.

Reference will now be made in detail to the embodiments of the present invention, examples of which are illustrated in the accompanying drawings.

The description below discloses some embodiments in such a detail that a person skilled in the art is able to utilize the invention based on the disclosure. Not all steps of the embodiments are discussed in detail, as many of the steps will be obvious for the person skilled in the art based on this specification.

For reasons of simplicity, item numbers will be maintained in the following exemplary embodiments in the case of repeating components.

FIG. 1 illustrates an embodiment of the apparatus and the method for inflating a casing enclosing a sausage stick. The apparatus 1 comprises a conveyor belt 12 configured to move in the direction of the arrows. A plurality of cleats or side supports 13 are disposed on the conveyor belt 12, the cleats 13 and the conveyor belt 12 forming a plurality of holders 2, 2'. Each of such holders could also be considered to be a slot. However, the holders could also be replaced e.g. by the holders described in FIGS. 5 and 6. Each holder is configured to receive a single sausage stick 3 enclosed in a casing 4, the cross-section of which is shown in this Figure. An input apparatus 11, for instance an input frame, table or conveyor or other suitable apparatus is configured to position, push or drop the sausage sticks 3 into the holders 2. A single sausage stick 3 fits in each holder 2 upon being received in the holders 2. The holder in position A is in the inflation start position, and the casing 4 in this position is penetrated by an inflating needle 5. The apparatus comprises a plurality of inflating needles 5; they are connected via a mount 14 to a belt 15 configured to move the inflating needles 5 in the direction of the arrows. The belt 15 could, in principle, also function as a covering in the same manner as e.g. the cover plate 25 of FIGS. 2 and 3 or the lid 33 of FIG. 6. The mount 14 may also comprise or be in fluid connection to a source of pressurized gas, such as pressurized air (not shown). Various means for providing pressurized gas to an inflating needle are known. When the apparatus is in use, the inflating needle 5 penetrates the casing 4, and pressurized gas is conveyed through the inflating needle 5 into the casing 4 in the inflation starting position A; when the sausage stick 3 moves in the holder 2, the inflating needle 5 follows the holder and the sausage stick so that the inflating needle 5 is immoveable relative to the holder 2 and the sausage stick 3 between the inflation starting position A and the inflation end position B. The holder denoted by 2' is in this figure in the inflation end position B, the inflating needle denoted by 5' that has followed the holder 2' has stopped conveying air into the casing, and the casing is inflated.

In this embodiment, the inflating needles 5 and the belt 15 configured to move the inflating needles are not physically connected to the holders 2 or the conveyor belt 12. Instead, the belt 15 may be driven by suitable means, e.g. by a first motor 16. The conveyor belt 12 is driven by suitable means, such as a second motor 17. The first motor 16 and the second motor 17 may however be controlled e.g. by a computer (not shown) so that the inflating needles may be configured to follow the holders immoveably relative to the holders.

Inflated casings 4″ and the sausage sticks 3″ enclosed therein may then be discharged, e.g. to an output conveyor or table 18, for further processing.

Figure 2:
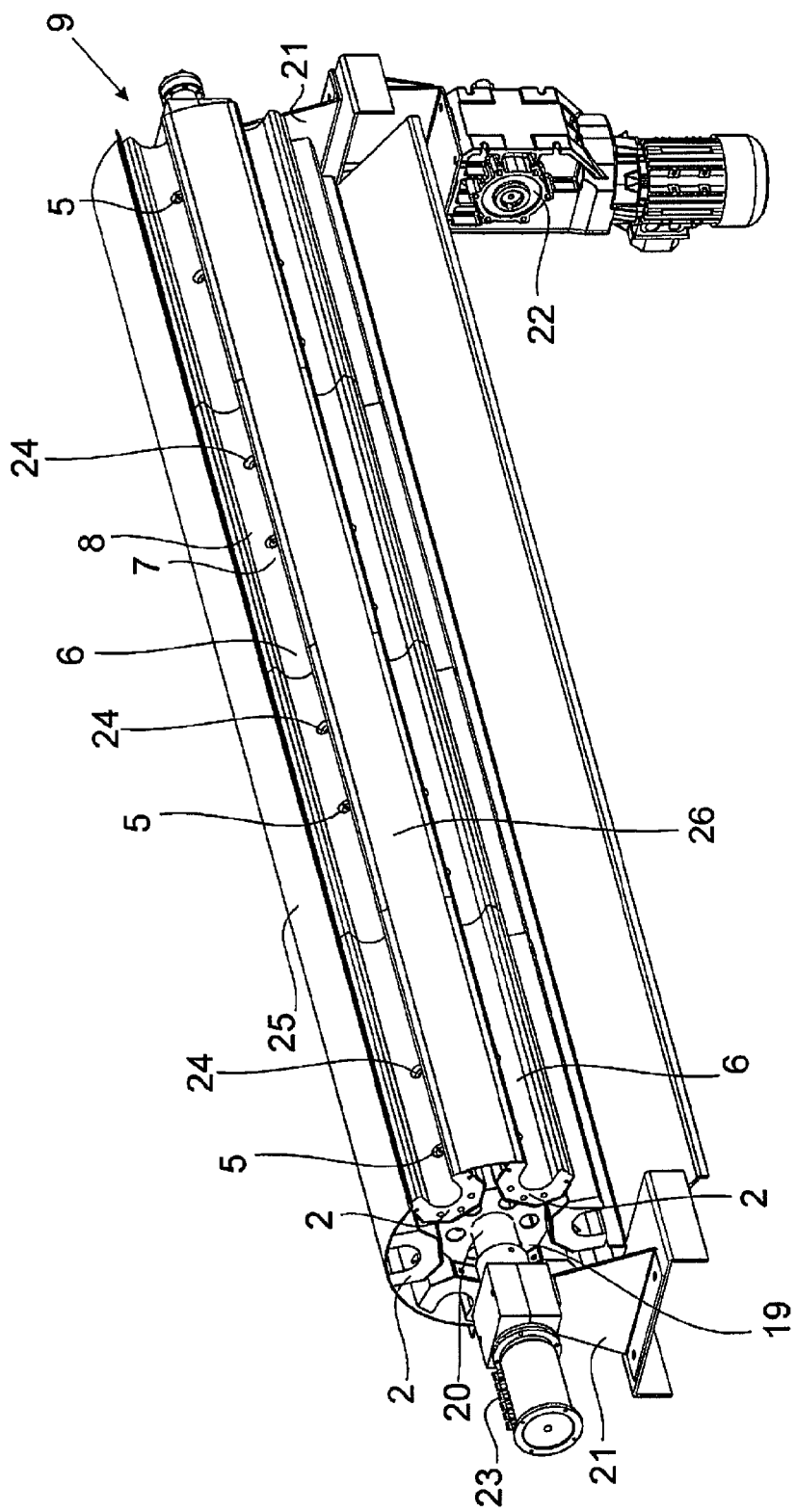
FIG. 2 shows another embodiment of the apparatus.

FIG. 2 shows another embodiment of the apparatus for inflating a casing enclosing a sausage stick. In this embodiment, the apparatus comprises a rotatable or revolvable conveyor 9, i.e. a rotatable revolver conveyor. In this Figure, the revolver conveyor is in a horizontal position, but it could also be disposed in an upright position; then sausage sticks hanging generally vertically downward could be fed into the holders. The conveyor comprises a plurality of holders 2. Each holder 2 is removably connected to a support frame 19, so that it is possible to remove, replace and reattach individual holders 2 independently. The support frame 19 is connected to a shaft 20 and is thus rotatable or revolvable around the shaft. The shaft 20 is further supported by support members 21. The shaft is rotatable by suitable means, such as a motor 22; various means suitable for rotating a shaft are known. The shaft 20 is provided with one or more fittings 23 opening into gas channels (not shown) that are in fluid connection with each inflating needle 5. The fittings 23 and the gas channels are thus configured to provide pressurized gas, such as air, to the inflating needles 5 and thereby into the casings when the apparatus is in use.

The holders 2 are elongated, and each holder 2 has an elongated slot 6, the slot 6 being sufficiently long and wide to receive and accommodate a sausage stick (not shown) of a predetermined diameter and length when the apparatus is in use. In this embodiment, the slot 6 is a groove having a U-shaped cross-section, but the slot 6 might as well have a different cross-section, provided the slot may still receive and accommodate the sausage stick. The bottom 7 of each slot 6 has a support surface 8 configured to face the casing enclosing a sausage stick received in the slot. Inflating needles 5 protrude from the support surface 8. This embodiment comprises a plurality of inflating needles 5 in each slot 6 along the length of the slot, but only one inflating needle could also be disposed in each slot. In this embodiment, the inflating needles 5 are removable and replaceable. Each holder is shown here having empty mounting slots 24 for mounting additional inflating needles along the length of the slot, for instance in cases where additional inflating needles might be useful to improve inflating results. In this embodiment, the gas channel(s) 27 extend along the length of the slot 6 to convey gas to the inflating needles disposed along the length of the slot. Such adjustments may be useful in particular when there are variations in the quality and/or adhesion of casings to the surface of sausage sticks. Additional inflating needles may also be disposed e.g. close to or at one end of the slot or close to or at both ends of the slot, for instance in situations when the casing adheres more strongly in the surfaces of the sausage stick that are close to one or both ends of the stick than those surfaces that are close to the middle of the stick.

The apparatus further comprises a covering, in this embodiment a curved cover plate 25. The cover plate 25 is configured to cover a part of the rotatable conveyor 9, so that it covers the openings of one or more of the slots 6 and leaves the remaining slots unobstructed. The cover plate 25 is thus configured to cover at least a part of at least one slot 6, in this exemplary embodiment several slots, and thereby to prevent the sausage stick received in the slot and thus covered from being discharged from the slot. As the other slots that are not covered by the cover plate 25 are unobstructed, they can receive or discharge other sausage sticks, depending on the position of the slots. The apparatus may also comprise one or more baffle plates 26 between two adjacent holders. The baffle plate is 26 configured to cover the space between two adjacent holders 2, to thereby prevent any sausage sticks from entering the space between two adjacent holders. The baffle plate 26 shown in this exemplary embodiment may be mounted to two adjacent holders 2.

Figure 3:
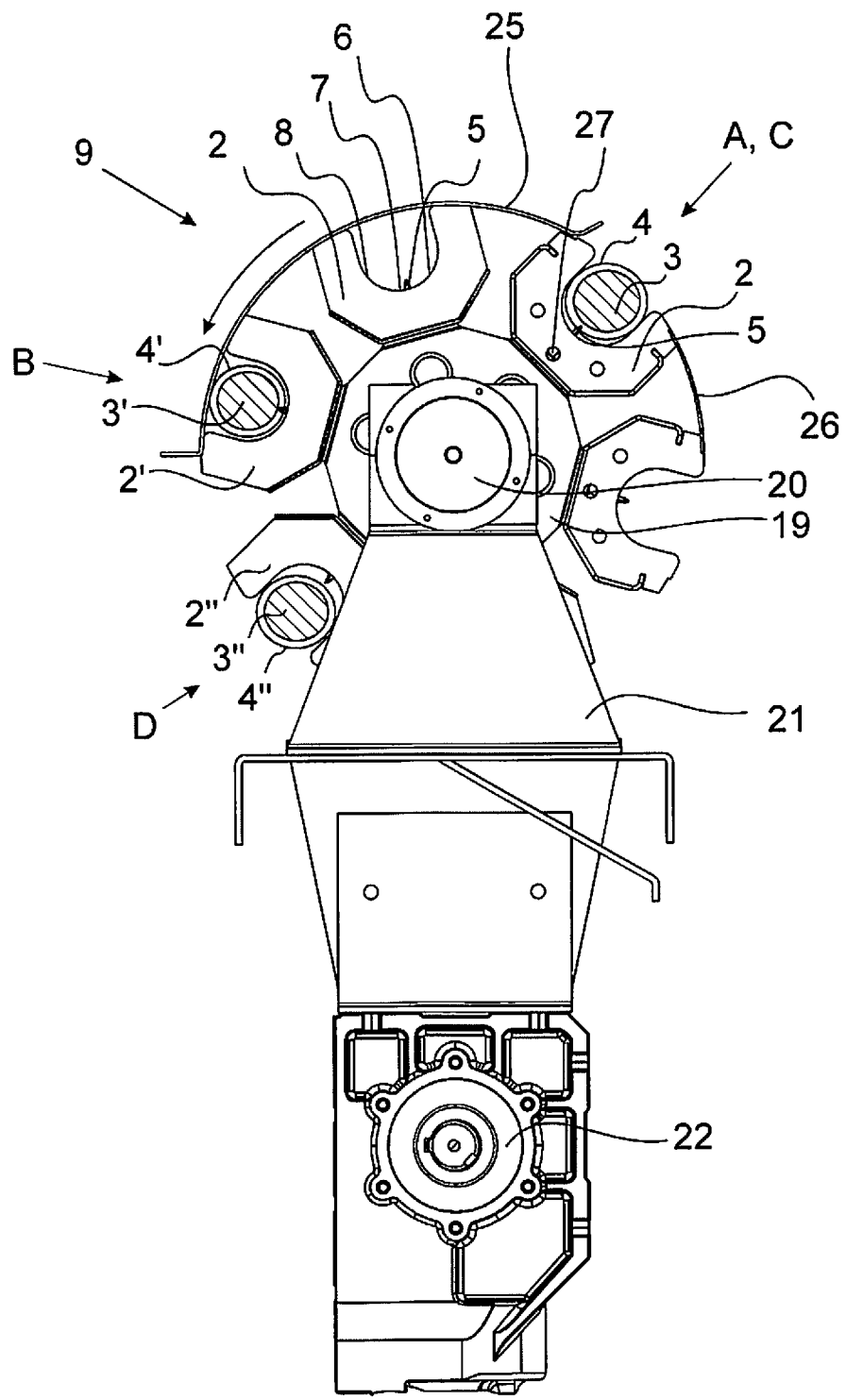
FIG. 3 shows a side view of the embodiment of FIG. 2.

FIG. 3 illustrates a cross-sectional view of the exemplary embodiment shown in FIG. 2 and also illustrates an embodiment of the method. This exemplary embodiment comprises six holders, but it might as well comprise e.g. 1, 2, 3, 4, 5, 6, 7, 8, 9, or 10 or more holders, depending e.g. on the size of the revolver conveyor 9 and the holders 2. The holder 2 in the receiving position C can receive a sausage stick 3 enclosed in a casing 4 in slot 6. The inflating needle 5 protrudes from the support surface 8 at the bottom 7 of each slot 6, and therefore the casing 4 of sausage stick 3 is penetrated by the inflating needle 5 as it enters the slot 6. As the inflating may thus start already at the receiving position C, in this embodiment the receiving position C may also be the same position as the inflation start position A. In this side view, gas channels 27 that are in fluid connection with each inflating needle 5 are shown. The gas channel 27 may extend along the entire length of the elongated holder 2.

When in use, the conveyor 9 rotates or revolves around the shaft 20 in the direction of the arrow, thereby moving the holders 2 and any sausage sticks 3 enclosed in casings 4 along a curved path. The shaft 20 is again supported by a support member 21 and rotatable by a motor 22 or other suitable means. As the holder moves from the inflation start position A to the inflation end position B, the inflating needle 5 penetrates the casing between these positions and can convey pressurized gas into the casing 4. As the inflating needle is integrated in the holder, it is configured to follow the holder when the holder and the sausage stick in the slot of the holder moves. The support surface 8 restricts the radial expansion of the casings being inflated. The cover plate 25 covers two slots at any given time and may thus also provide a part of the support surface or an additional support surface to restrict the radial expansion. When a holder, in this figure the holder denoted by 2′, is in the inflation end position B, the inflating is stopped, and the casing denoted by 4′ around the sausage stick denoted by 3′ is fully inflated to the desired dimensions. In the discharging position D, the sausage stick 3″ enclosed in its fully inflated casing 4″ is no longer penetrated by the inflating needle, and it can be discharged from the holder 2″. For instance, it may simply fall off the slot due to the effect of gravity. The baffle plate 26 between two adjacent slots may prevent sausage sticks from being lodged between the two adjacent slots.

Figure 4:
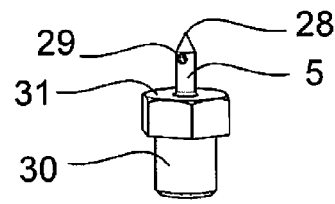
FIG. 4 illustrates an embodiment of the inflating needle.

FIG. 4 illustrates an embodiment of the inflating needle 5. Inflating needles according to this exemplary embodiment may be removably mountable, for instance in the mounting slots 24 shown in FIG. 2. The inflating needle 5 has a sharp tip 28 configured to penetrate casings enclosing sausage sticks. The inflating needle has at least one opening orifice 29 opening to the side surface of the inflating needle; it might, however, have two or more such opening orifices 29. The opening orifice 29 may be disposed at a distance from the tip 28, for example at a distance of at least 10%, 20%, or 30%, or 50% of the length of the inflating needle. In such embodiments, it may be in some conditions possible for the tip 28 of the inflating needle to accidentally penetrate the sausage stick, but if the opening orifice 29 is disposed at a distance from the tip, the opening orifice 29 may remain outside of the sausage stick and so may be unobstructed by the emulsion forming the sausage stick. However, the output orifice might also be disposed at the tip 28. The inflating needle 5 is in this exemplary embodiment mounted on an abutment 30 that may be configured to be mounted in the mounting slots 24. The abutment 30 may have a flange 31 configured to face the surface of the casing to be penetrated. The surface of the flange 31 configured to face the surface of the casing is the surface from which the inflating needle 5 protrudes. The flange 31 may thus be configured to limit the depth into which the inflating needle 5 can penetrate the casing. Although not shown in this figure, the inflating needle 5 and the abutment 30 have a conduit suitable for conveying or configured to convey pressurized gas into the penetrated casing. The conduit may, when the inflating needle is mounted in a holder, be in fluid connection with the gas channel 27 shown e.g. in FIG. 3.

Figure 5A:
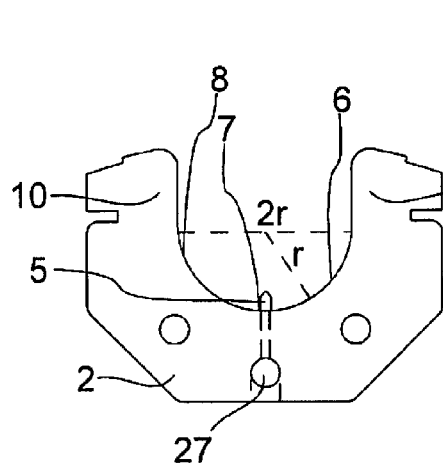
FIGS. 5A and 5B show an embodiment of a holder for an embodiment of the apparatus.

FIG. 5 shows a cross-section of an embodiment of a holder for an embodiment of the apparatus, for instance the embodiment shown in FIGS. 2 and 3. In FIG. 5A, the inflating needle 5 in fluid connection with the gas channel 27 is again disposed at the bottom 7 of the slot 6 and protrudes from the support surface 8. The support surface 8 has a U-shaped cross-section. The support surface 8 is formed of the bottom 7 having a semi-circular cross-section with radius r, and of the surfaces of the side supports 10 extending to the direction opposite to the bottom 7. The distance between the opposing surfaces of the side supports 10 is twice the radius r, i.e. 2r. The slot 6 is configured to receive a casing having a predetermined recommended maximum stuffing diameter. The distance 2r may be smaller than or equal to the recommended maximum stuffing diameter of the casing. The diameter of the sausage stick 3 is smaller than the distance 2r. This exemplary holder or a plurality of these holders might also be disposed on the conveyor 12 described in FIG. 1.

Figure 5B:
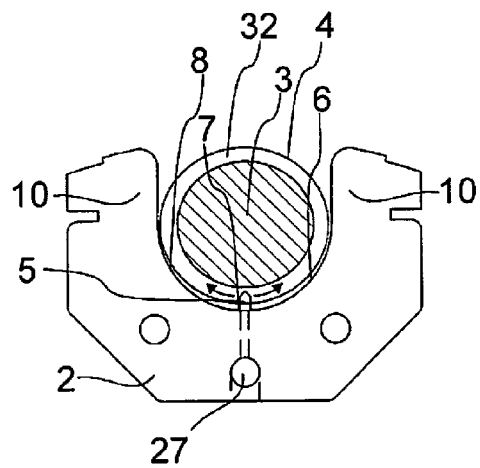

In FIG. 5B, the same holder is shown accommodating a sausage stick 3 enclosed in the casing 4. When in use, the inflating needle 5 penetrates the casing 4 and conveys pressurized gas, for instance air, into the space 32 between the casing 4 and the sausage stick 3. The direction of the movement of the gas conveyed, i.e. blown, in the space 32 is shown with arrows. As the casing 4 radially expands away from the surface of the sausage stick 3 upon inflating, the surface of the casing eventually reaches and touches the support surface 8, and the support surface 8 thereby exerts a pressure to the outer surface of the casing, thereby counteracting the pressure inside the inflated casing. The support surface 8 thus restricts the radial expansion of the casing. It may therefore reduce the risk of the casing being overinflated and may even prevent the casing from overinflating and possibly bursting open.

Figure 6:
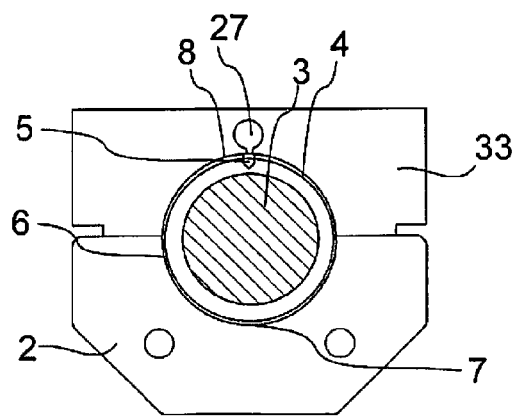
FIG. 6 shows another embodiment of a holder for an embodiment of the apparatus.

FIG. 6 shows another embodiment of a holder for an embodiment of the apparatus, similar to the embodiment of FIG. 5. In this exemplary embodiment, the holder 2 further comprises a lid 33 that may be openable. It may, for instance, be pivoted so that the holder 2 may be openable so that the slot 6 may receive a sausage stick 3 enclosed in a casing 4 when the lid 33 is in an open position (not shown). In this embodiment, when the lid 33 is in the closed position, the support surface 8 is formed of the surface of the bottom 7 of the slot 6 having a semi-circular cross-section and of the surface of the lid 33 configured to face the surface of the casing 4. Said surface of the lid opposes the surface of the bottom 7 of the slot. The slot 6 thus has a generally circular cross-section. The lid 33 is also configured to function in a similar manner as the cover plate in FIGS. 2 and 3. In this embodiment, the inflating needle 5 is mounted on the lid 33 such that the inflating needle 5 protrudes from the support surface 8, i.e. from the part of the support surface formed by the surface of the lid. The lid 33 is also provided with a gas channel 27 that is in fluid connection with the inflating needle 5. As the slot 6 has a circular cross-section, the support surface 8 restricts the excess or too rapid radial expansion of the casing, thus reducing the risk of early casing burst quite efficiently. The bursting of the casing is disadvantageous for final casing detaching. In this exemplary embodiment, a second inflating needle could also be provided at the bottom 7 of the slot.

Figure 7:
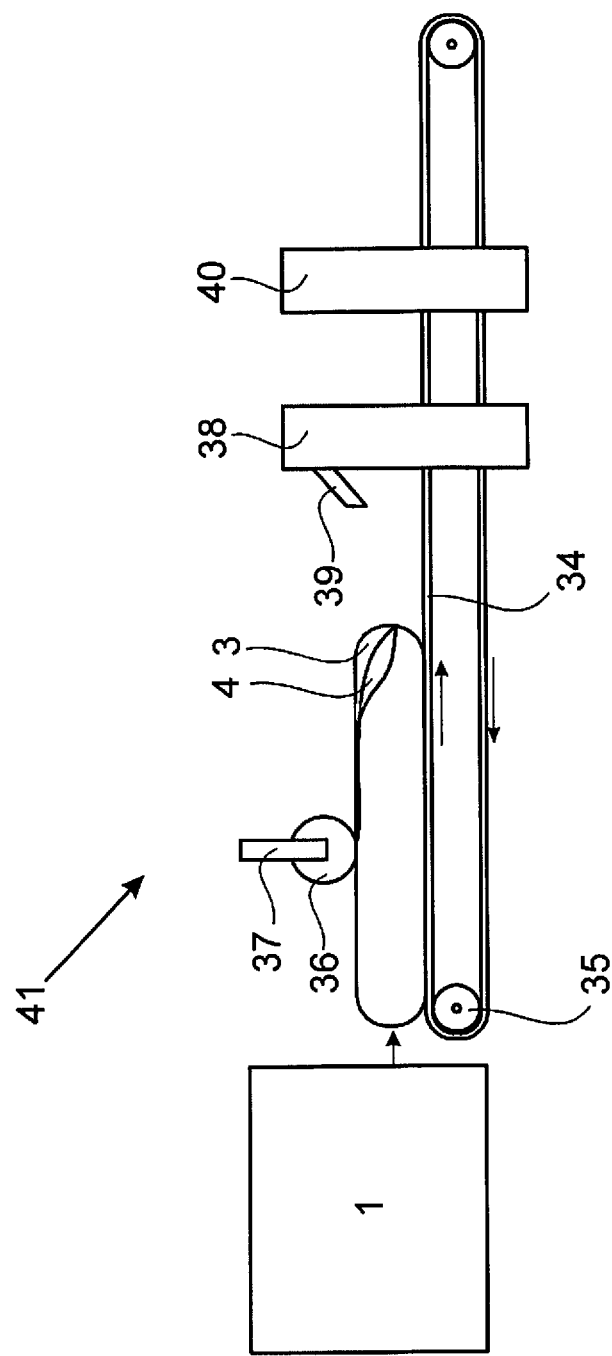
FIG. 7 illustrates an embodiment of the apparatus for removing the casing.

FIG. 7 illustrates an embodiment of the apparatus and method for removing the casing enclosing a sausage stick. For simplicity, and to emphasize that various embodiments of the apparatus for inflating the casing may be included in the apparatus 41 for removing the casing, the apparatus 1 for inflating the casing is shown only very schematically. A sausage stick enclosed in an inflated casing 4 may exit the apparatus 1 for inflating the casing and be transported on a transport apparatus, such as a transport conveyor 34 driven e.g. by a motor 35. The elongated sausage stick 3 is shown in this figure from the side as opposed to the other figures. The sausage stick 3 may be transported on the transport conveyor 34 in the direction of the arrow. The apparatus comprises a knife 36 mounted on a suitable knife support member 37. In this embodiment the knife 36 is stationary and may be rotatable; as the sausage stick 3 moves in the direction of its longitudinal axis, the knife 36 cuts or slits the casing 4 open along the longitudinal axis. The sausage stick 3 may then be transported on the transport conveyor 33 to an apparatus 38 for stripping the casing off the sausage stick. The apparatus 38 for stripping the casing off the sausage stick may comprise various means 39 for stripping off the casing 4, for instance a nozzle configured to blow pressurized gas and thereby blow the cut casing 4 off the sausage stick 3. The means 39 might also comprise, for example, a gripping member configured to grip and thereby strip the cut casing 4 off the sausage stick 3. The apparatus for removing the casing may further comprise an apparatus 40 for detecting any remaining fragments of the casing left on the surface of the sausage stick after stripping. For use in such an embodiment, the casing may comprise an ultraviolet-detectable component; suitable casings are e.g. those described in publication EP 2796048 (e.g. paragraphs [0010]-[0070] and [0100]-[0117]). The apparatus 40 may comprise an ultraviolet light source (not shown), for instance an ultraviolet lamp, a blacklight, a fluorescent lamp, a gas-discharge lamp, a LED or a laser emitting ultraviolet light. As the ultraviolet light source illuminates the surface of the sausage stick, any visible light emitted by the ultraviolet-detectable component in any remaining fragments of the casing left on the surface of the sausage stick may be detected visually, e.g. by an operator. Alternatively, the apparatus 40 may further comprise a sensor for detecting the visible light emitted by the ultraviolet-detectable component (not shown).

Figure 8:
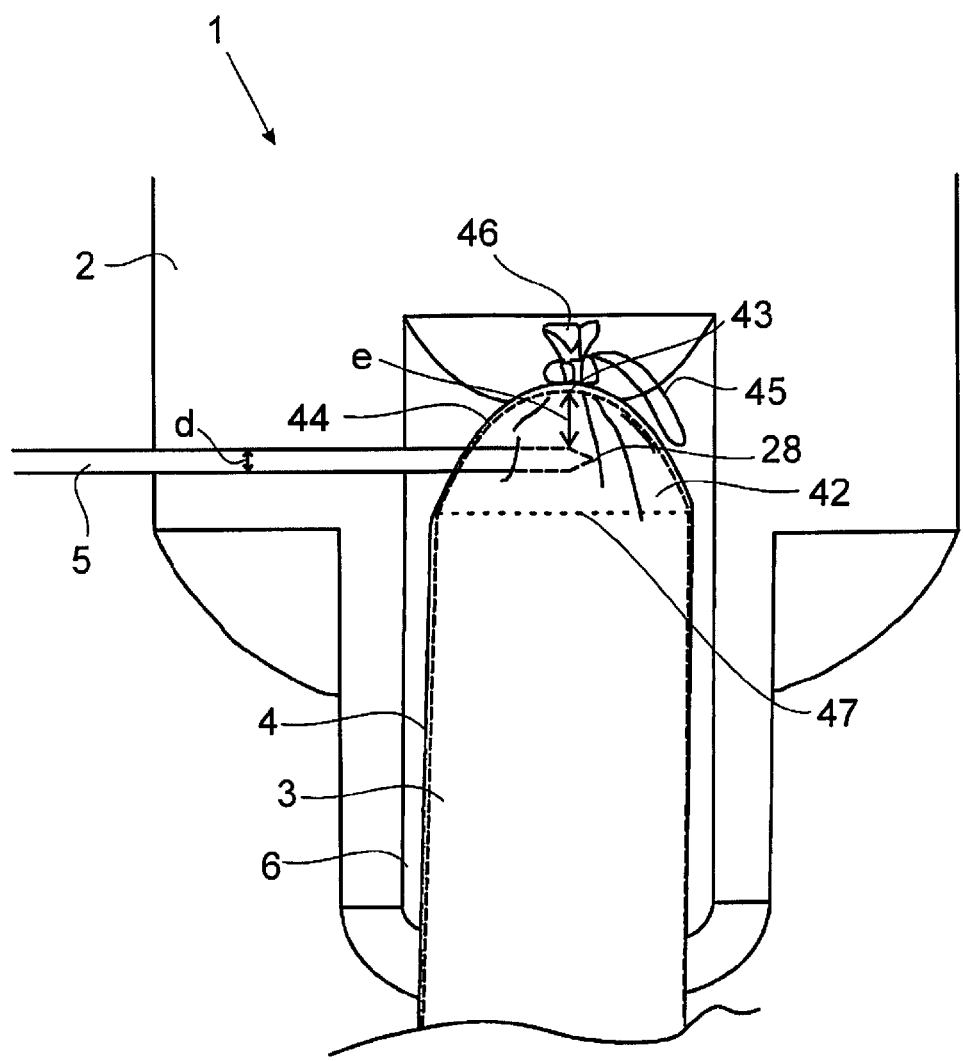
FIG. 8 shows an embodiment of the apparatus for inflating a casing enclosing a sausage stick.

FIG. 8 shows another embodiment of the apparatus for inflating a casing enclosing a sausage stick and a method for inflating the same. The apparatus 1 comprises a holder 2 having an elongated slot 6 configured to receive and hold a sausage stick 3 enclosed in a casing 4. The sausage stick 3, illustrated schematically with dashed lines, has an end portion 42 ending at an endmost edge 43. The casing 4 has an end portion 44 surrounding the end portion 42 of the sausage stick 3; the second end portion of the sausage stick 3 ending at a second endmost edge is not shown. The end portion 42 of the casing 4 is closed, as it is tied or otherwise secured by a suitable closing arrangement 45, such as a clip or a string, so that a tab 46 formed of the end of the casing 4 protrudes at the end of the casing 4. After the casing 4 is inflated, the end portion 42 of the sausage stick 3 may be cut off, leaving a substantially cylindrical elongated sausage stick. An exemplary cut-off line 47 at which the end portion 42 may be cut off is illustrated with a dashed line.

The apparatus comprises an inflating needle 5 having a sharp tip 28. The inflating needle 5 may have a thickness d. For example, the thickness d may be e.g. 0.5 to 5 mm. The inflating needle 5 may be configured to penetrate the end portion 44 of the casing 4 and optionally also the end portion 42 of the sausage stick 3 to inflate the casing 4. Such an inflating needle 5 may be configured to blow gas in the casing 4 and also inside the end portion 42 of the sausage stick 3; the gas blown inside the end portion 42 may find its way out of the sausage stick 3 and thereby inflate the casing 4. Depending on the properties of the sausage stick 3, such as the consistency, structure, temperature and/or adhesion of casing 4, inflating in this manner may be beneficial. Possible damage caused by the needle 5 may not be an issue during later processing, as the end portion 42 may be cut off and optionally reworked. In an embodiment, the needle 5 is configured to penetrate the end portion 42 of the sausage stick 3 at a distance e from the edge 43 of the end portion 42. The distance e may be equal to or greater than the thickness of the needle 5, or equal to or greater than two times the thickness d of the needle 5.

It is obvious to a person skilled in the art that with the advancement of technology, the basic idea of the invention may be implemented in various ways. The invention and its embodiments are thus not limited to the examples described above, instead they may vary within the scope of the claims.

The invention claimed is:

1. An apparatus for inflating a casing enclosing a sausage stick, the apparatus comprising
   a holder configured to receive the sausage stick enclosed in the casing and move together with the sausage stick thereby received from an inflation starting position to an inflation end position; and
   an inflating needle configured to penetrate the casing of the sausage stick received by the holder and to follow the holder immoveably relative to the holder moving together with the sausage stick from the inflation starting position to the inflation end position to inflate the casing between the inflation starting position and the inflation end position.

2. The apparatus according to claim 1, wherein the holder has an elongated slot configured to receive and hold the sausage stick enclosed in the casing, the slot optionally having a bottom of a semi-circular or U-shaped cross-section.

3. The apparatus according to claim 2, wherein the shape and size of the elongated slot are such that the support surface is configured to restrict the radial expansion of the casing being inflated, the slot being thereby configured to reduce the risk of overinflating the casing.

4. The apparatus according to claim 3, wherein the elongated slot has a bottom of a semi-circular cross-section, the slot further being formed of side supports extending in the direction opposite to the bottom of the slot and separated by a distance of each other, wherein the radius of the semi-circular cross-section of the bottom of the slot is smaller than or equal to half the recommended maximum stuffing diameter and the distance between the side supports is smaller than or equal to the recommended maximum stuffing diameter of the casing enclosing the sausage stick which the slot is configured to receive.

5. The apparatus according to claim 1, wherein the inflating needle is connected or coupled to the holder and/or slot.

6. The apparatus according to claim 1, wherein the holder or slot has a support surface configured to face the casing, and the inflating needle protrudes from the support surface.

7. The apparatus according to claim 1, wherein the holder and/or slot is configured to move together with the sausage stick in a direction parallel to the longitudinal axis of the sausage stick or in a direction perpendicular to the longitudinal axis of the sausage stick.

8. The apparatus according to claim 1 for inflating a plurality of sausage sticks, each sausage stick enclosed in a casing, wherein the apparatus comprises
   a plurality of holders, wherein each holder is configured to receive a sausage stick enclosed in a casing and move together with the sausage stick thereby received from an inflation starting position to an inflation end position, and
   a plurality of inflating needles, wherein each inflating needle is configured to penetrate the casing of a sausage stick and to follow at least one of the holders immoveably relative to the holder moving together with the sausage stick from the inflation starting position and the inflation end position to inflate the casing between the inflation starting position and the inflation end position.

9. The apparatus according to claim 1, wherein the apparatus comprises a rotatable conveyor, the conveyor comprising a plurality of holders and/or slots, wherein each holder and/or slot is configured to move together with the sausage stick along a curved path.

10. The apparatus according to claim 1, wherein the apparatus comprises
    a plurality of slots, each slot configured to receive a sausage stick enclosed in a casing and move together with the sausage stick thereby received from an inflation starting position to an inflation end position; and
    a covering, such as a cover plate, configured to cover at least a part of at least one slot to thereby prevent the sausage stick received in the slot from being discharged from the slot.

11. An apparatus for removing a casing from a sausage stick enclosed in the casing, comprising the apparatus for inflating the casing enclosing the sausage stick according to claim 1 and optionally comprising one or more of the following:
    an input apparatus configured to feed the sausage stick enclosed in the casing into the apparatus for inflating the casing;
    a cutting apparatus configured to cut open the inflated casing;
    a stripping apparatus configured to strip the casing off the sausage stick;
    an apparatus for detecting any remaining fragments of the casing left on the surface of the sausage stick after stripping.

12. A method for inflating a casing enclosing a sausage stick, comprising
    providing the sausage stick enclosed in the casing;
    penetrating the casing with an inflating needle; and
    moving the sausage stick enclosed in the casing from an inflation starting position to an inflation end position;
    wherein the inflating needle follows the sausage stick immoveably relative to the sausage stick moving from the inflation starting position to the inflation end position, the inflating needle thereby inflating the penetrated casing between the inflation starting position and the inflation end position.

13. The method according to claim 12, wherein moving the sausage stick enclosed in the casing in a direction parallel to the longitudinal axis of the sausage stick or in a direction perpendicular to the longitudinal axis of the sausage stick.

14. The method according to claim 12, the method comprising receiving the sausage stick enclosed in the casing in a slot having a support surface facing the casing enclosing the sausage stick received therein;

wherein upon inflating the casing, the support surface restricts the radial expansion of the casing being inflated and thereby reduces the risk of overinflating the casing.

15. The method according to claim 12, wherein the sausage stick provided is enclosed in a casing having a predetermined recommended maximum stuffing diameter; the method comprising receiving the sausage stick in a slot having a support surface facing the casing enclosing the sausage stick received therein, the slot having a diameter smaller than or equal to the predetermined recommended maximum stuffing diameter of the casing;

wherein upon inflating the casing, the support surface restricts the radial expansion of the casing being inflated and thereby prevents the casing from overinflating.

16. The method according to claim 15, wherein the slot is an elongated slot having a bottom of a semi-circular cross-section, the slot optionally further being formed of side supports extending in the direction opposite to the bottom of the slot and separated by a distance from each other, the support surface being thus formed of the surface of the bottom and/or further of the surfaces of the side supports facing each other, wherein the radius of the semi-circular cross-section of the bottom is smaller than or equal to half the recommended maximum stuffing diameter and the distance between the side supports is smaller than or equal to the recommended maximum stuffing diameter.

17. A method for removing a casing from a sausage stick enclosed in the casing, comprising inflating the casing enclosing the sausage stick according to the method defined in claim 12; or cutting open the inflated casing; and stripping the inflated casing off the sausage stick.

* * * * *